July 22, 1969 G. J. OVERTVELD 3,457,507
METHOD AND APPARATUS FOR MATCHING THE CURRENT/VOLTAGE
CHARACTERISTICS OF TWO NONLINEAR RESISTANCES
Filed July 6, 1966 3 Sheets-Sheet 1

INVENTOR
G. J. OVERTVELD

BY Curphey + Erickson
PATENT AGENTS

United States Patent Office 3,457,507
Patented July 22, 1969

3,457,507
METHOD AND APPARATUS FOR MATCHING THE CURRENT/VOLTAGE CHARACTERISTICS OF TWO NONLINEAR RESISTANCES
Gilles J. Overtveld, Ottawa, Ontario, Canada, assignor to Northern Electric Company Limited, Montreal, Quebec, Canada
Filed July 6, 1966, Ser. No. 563,133
Int. Cl. G01r 15/00, 27/00
U.S. Cl. 324—158                    2 Claims

ABSTRACT OF THE DISCLOSURE

A method of matching the current/voltage characteristics of pairs of diodes which comprises passing equal currents of varying amplitude through each of the diodes when connected in series opposition and measuring and recording the voltage difference across the two diodes.

---

Figure 1:
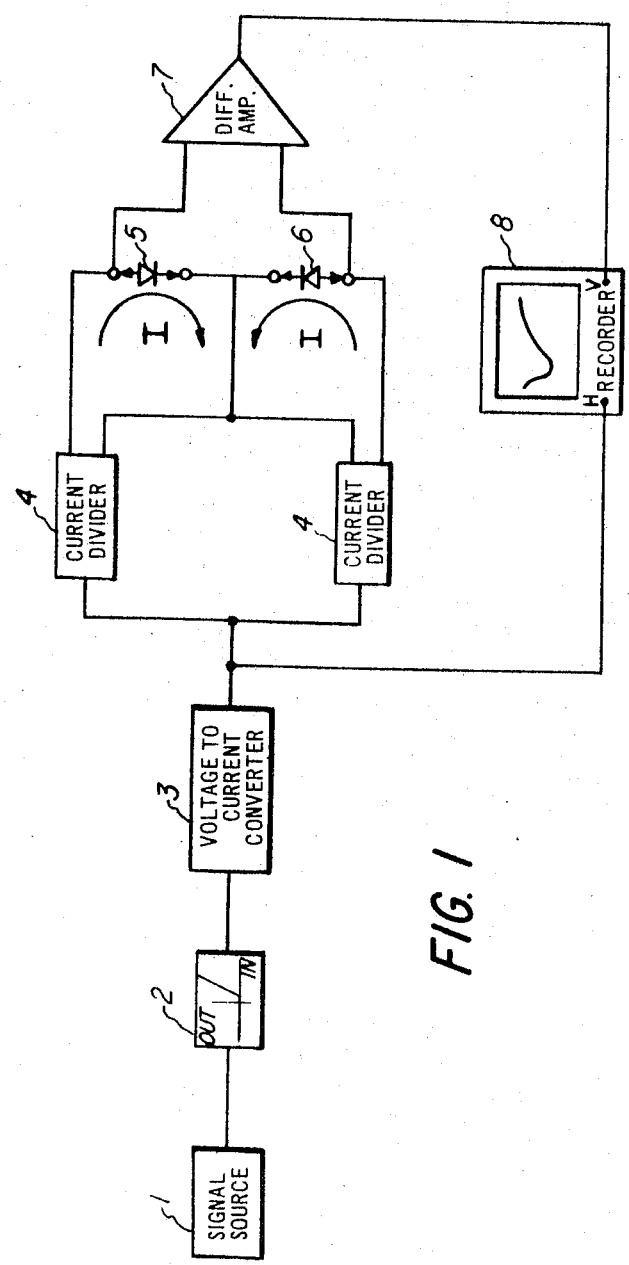

This invention relates to dynamic matching of electrical device characteristics and more particularly to a method and apparatus for matching pairs of semiconductive devices such as diodes to a high degree of precision over a wide dynamic range.

Previous methods for matching pairs of diodes included the steps of arbitrarily choosing a number of current points and measuring the junction voltage at each point, recording the set of voltages obtained on each diode and then comparing the characteristics thereof until pairs of diodes were found having a similar characteristic within a predetermined range. The above method is not satisfactory because, in order to obtain the accuracy of 3 mv. in 300 mv. required sometimes in todays applications of semiconductor devices cooling must be provided during application of the various current values to maintain the junction temperature constant because junction voltages change about −3 mv./° C. Furthermore measuring and recording using the above method is costly and in order to reduce the cost it has been the practice to accept diodes as matched if there was sufficient agreement in their characteristics over a minimum number of points in their operating range which is not satisfactory in a number of cases.

U.S. Patent 2,892,156 issued to Dawson on June 23, 1959, discloses an apparatus for sorting diodes into matched pairs which overcomes some of the drawbacks of the prior art. It teaches the idea of measuring pairs of diodes one against the other and recording the differences between the two characteristics. The Dawson patent is an advantage over the prior art because it discloses an automatic apparatus which cuts down some of the costs. By measuring pairs of diodes one aginst the other, the effects of junction temperature are cancelled to some degree.

However the Dawson patent suffers from the following discrepancies:

(1) The diodes under test are mounted a large distance apart and this does not take into account the effects of the difference in ambient temperature on the diodes which become important when they must be matched with 3 mv.

(2) The diodes under test are supplied from the same voltage source without any means to equalize the currents flowing in the diodes under test thus defeating any attempt to measure small differences in the order of millivolts.

(3) The output from the comparator disclosed is dependent on the integration of a series of current pulses whose height depends on the voltage differences across the two diodes. This method which depends on total voltage difference area, does not give information at what particular point of the current range a difference has occurred.

(4) Perhaps the most serious limitation of the method is that basically it can only determine whether a diode is either equal or not equal within certain limits to a standard. Specific information as to the degree of difference is not available. This has the following implications: Pairs can only be formed from two diodes that are equal to the standard. Two diodes that are identical but not necessairly equal to the standard would be rejected. To obtain a satisfactory yield by including such pairs in the selection process, it has become necessary in the patented method to compare each diode with all others whereby all possible combinations are exhausted resulting in a laborious and costly process.

The drawbacks of the prior art have been overcome by the method of the invention which consists of mounting in close proximity and connecting in series a diode or any electrical device to be tested and a similar device arbitrarily chosen as a standard, and passing simultaneously through each device opposite equal currents varying in magnitude over a range of interest. The instantaneous voltage difference between the two devices due to the difference in their characteristics is applied to the vertical plates of an oscilloscope or a similar recording device. The horizontal deviation of the recording instrument is made dependent on the driving current. The trace on the recording instrument will indicate the differences at any point of the current range between the characteristics of the devices and may be reproduced for comparison with the characteristics of the other devices of the group to be matched.

A first advantage of the invention is that the degree of deviation at any point of the current range with respect to an arbitrarily chosen standard is completely known. It is only necessary to compare each electrical device once against the standard. Then from the recorded deviations, pairs can be selected which not necessarily need be equal to the standard. Pairs may be formed from devices which differ from the standard by the same or a proportional amount. Thus with a minimum of physical effort a maximum yield of all possible pairs is achieved and it becomes unnecessary to compare each device against all the others.

A second advantage of the invention is that the temperature conditions of the devices are the same because indentical currents flow through them and because they are in close proximity to each other.

Figure 2:
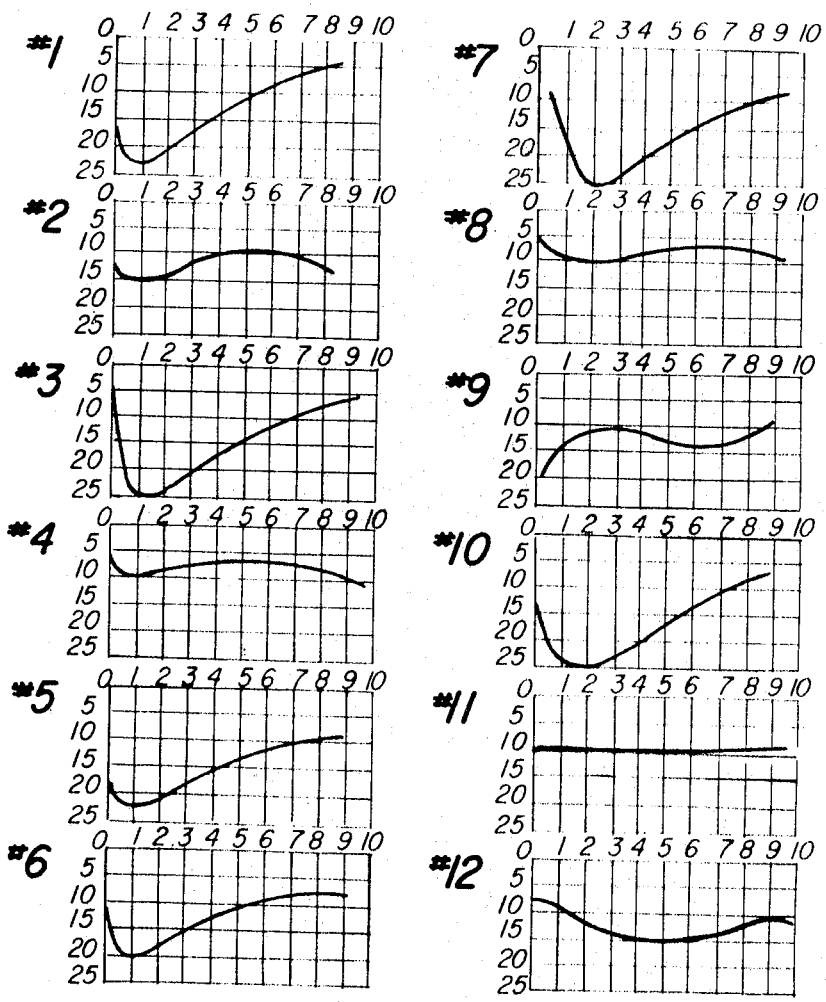
Figure 3:
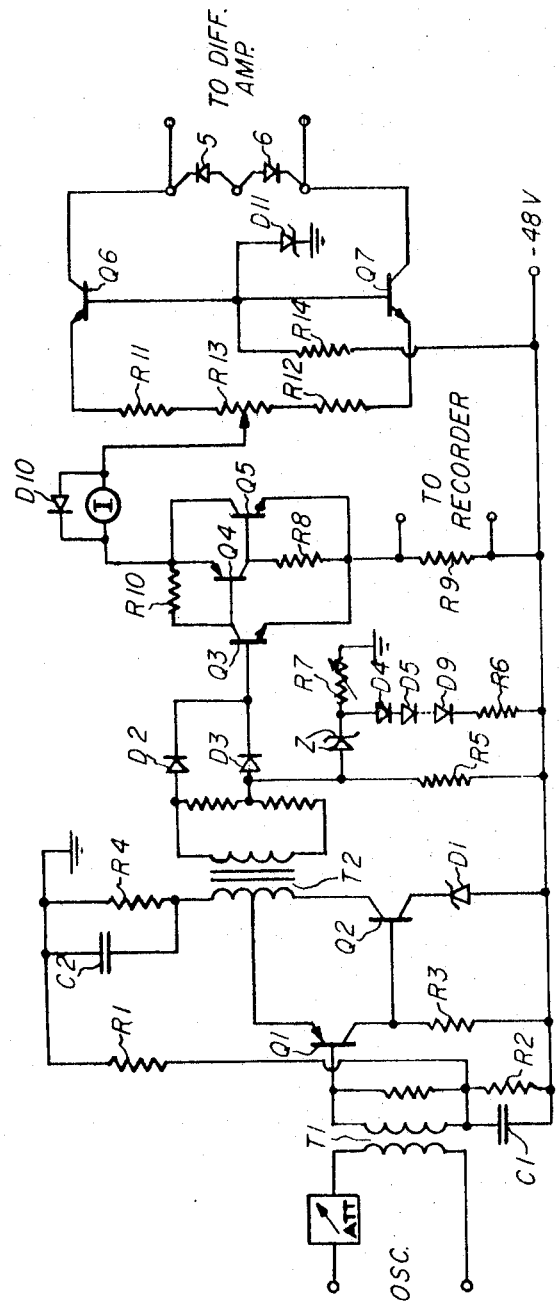

The invention will now be described with reference to the accompanying drawings which describe a preferred embodiment of the invention in which:

FIG. 1 is a system block diagram of the invention;
FIG. 2 illustrates a series of curves obtained during the test of a number of diodes; and
FIG. 3 is a detailed description of the preferred embodiment of the invention.

In the system block diagram illustrated in FIG. 1, there is shown a signal source 1 of a suitable frequency, say 100 c.p.s. for example, supplying a sinusoidal voltage to a block 2 having a nonlinear transfer function which eliminates output voltages below a certain minimum level. The output of block 2 is a voltage which varies periodically from a minimum to a maximum positive value. It is to be understood however, that other periodic wave forms such as a sawtooth for example, could be used.

The voltage output of block 2 is applied to a voltage to current converter 3 having a high output impedance. The output of current converter 3 drives two current dividers 4 which supply simultaneously identical currents over a range of interest, say from 100 μa. to 100 ma. for example, to diodes 5 and 6 connected back to back. Diode 5 may be one of a group of diodes to be tested and 6 a diode arbitrarily chosen as a standard. The difference voltage across diodes 5 and 6 is fed to a balanced or differential amplifier 7 whose output is applied to the vertical plates of an oscilloscope 8 such as a Tektronic 502. The horizontal plates of the oscilloscope 8 are supplied with a sample of the driving current. The voltage difference between the two diodes 5 and 6 versus current is displayed on the oscilloscope.

It is important to note here that since the diodes are positioned in close proximity to each other the ambient temperature equally affects both diodes. Furthermore, at any time each diode junction passes the same current and the increase or loss of heat per junction is equal. Consequently, the fluctuations of junction temperature with time are equal.

Another important aspect is that the degree of actuation at any point of the current range with respect to an arbitrarily chosen standard is completely known with the effect that it is necessary to compare each diode only once against a standard as mentioned previously.

The testing operation is carried out as follows: Diode 6 is arbitrarily chosen as a reference and is positioned in the circuit. All the other diodes in the lot to be tested are identified by a number and the first one to be tested is inserted in the testing apparatus to be compared with the standard. The level of the signal source is then set for the maximum current through which the diodes are desired to be swept. The oscilloscope will then display the voltage difference between the diode under test and the reference for the full range of current desired. A replica of the curve on the oscilloscope may then be made using the graduations on the scale of the oscilloscope.

This procedure is then repeated for each diode. The various curves are recorded on a sheet of paper such as shown in FIG. 2 of the drawings and compared with each other. If the characteristic of the diode under test is identical to the reference, or differs from it by a linear resistance factor, the resulting trace will be a straight line such as curve #11 in FIG. 2. In general, practical circuitry using matched diodes will include other components and means must be provided to balance these in the circuit anyway. Consequently static balance of the diodes is not too significant and a greatly increased yield from the matching operation is achieved by grouping together diodes which differ by a linear resistance factor only. Pairs may also be formed with diodes which are not identical to the standard but differ from the standard by a proportional amount. For example in FIG. 2, diodes 1 and 10, 3 and 5 or 2 and 8 have similar characteristics. If they are compared with each other on the testing apparatus, the resultant trace should be a straight line displaced up or down on the screen of the oscilloscope depending on the difference in the linear resistance factor. It is seen therefore that out of a lot of diodes, pairs of diodes may be easily matched and that it is not necessary to compare each diode with all others such as it was done in the above mentioned Dawson's patent.

The detailed circuit diagram of the testing apparatus is shown in FIG. 3. A sine wave from a 100 c.p.s. oscillator is applied through an attenuator ATT. to the primary of transformer T1. The attenuator determines the maximum test current. The secondary of transformer T1 is conected to an A.C. amplifier circuit comprising transistors Q1 and Q2. The A.C. amplifier is in many aspects similar to the amplifier circuit disclosed in applicant's Canadian Patent 781,008, issued Mar. 19, 1968 and reference is made thereto for a more detailed description. The output of the amplifier is provided by transformer T2 connected in the collector circuit of transistor Q2. A tap from the primary of transformer T2 provides feedback between Q1 and Q2. Resistors R1 and R2 provide proper bias for the base of transistor Q1. D1 is a reference diode which provides a low impedance and determines the bias current of Q1 in combination with resistor R3. C1 decouples the bias resistors R1 and R2 and C2 and R4 provide bias stability through D.C. feedback.

The sine wave from the 100 c./s. oscillator is amplified and appears at the secondary of transformer T2. It is to be understood however that an amplifier would not be required in the case where a signal of suitable amplitude may be provided.

The output of transformer T2 is passed through a half wave rectifier comprising diode D2. The output of the half wave rectifier is applied to the base of transistor Q3 which forms part of a D.C. amplifier comprising transistors Q3, Q4 and Q5 and acting as a voltage to current converter. The diode D2 conducts on the positive half of the output voltage only. When the output goes negative, Q3 is not cut off as it would normally happen but is kept conductive by the biasing voltage appearing across R5 which causes a minimum quiescent current of say 100 $\mu$a. to flow through a diode D3. The voltage across R5 is the sum of the voltage across R6 and diodes D4–D9 minus the reference voltage of reference diode Z.

Since the junction voltage of diode D3 and transistors Q3, Q4 and Q5 varies with ambient temperature a temperature compensation circuit comprising diodes D4—D9 and reference diode Z provides the necessary temperature compensation for holding the quiescent current constant. The temperature compensation circuit forms part of applicant's copending application 553,498 filed concurrently therewith and reference is made thereto for a complete description. The fixed biasing potential across resistor R5 is adjusted by varying resistor R7 and the rate of change with temperature which compensates for the rate of change of D3, Q3, Q4 and Q5 is set by $$\frac{R5}{R5+R6}$$

at about −8 mv./° C.

The D.C. amplifier comprising transistors Q3, Q4 and Q5 has a high output impedance which forces current division in the current divider which will be described later. NPN transistor Q3 and PNP transistor Q4 form a complementary feedback pair of the type disclosed in Canadian application 924,736 referred to previously. The collector of transistor Q3 is connected to the base of transistor Q4. The collector of transistor Q4 is connected to a source of D.C. potential through resistors R8 and R9. The emitter electrode of transistor Q3 is connected to a point between resistors R8 and R9. The emitter of transistor Q4 is connected to the collector of transistor Q3 through resistor R10. The base of transistor Q5 is connected to the collector of transistor Q4. The collector of transistor Q5 is connected to the emitter electrode of transistor Q4. The emitter electrode of transistor Q5 is connected to a point between resistors R8 and R9.

The exact operation of the above D.C. amplifier is not clearly understood. However, it has the properties desired in the present application namely high input and output impedances. Another desirable property of this circuit is that the operating point thereof is substantially not affected by the amount of current that has flown through it. This last property is necessary to maintain the 100 $\mu$a. threshold through the amplifier over long periods of time independent of use. It is only sensitive to ambient temperature changes which are corrected for in the tempera-tube compensation circuit described previously.

The output current from the D.C. amplifier is applied to a current divider comprising transistors Q6 and Q7 which can drive equal currents through the diodes under test. The emitters of transistors Q6 and Q7 are interconnected through two fixed resistors R11 and R12 of equal value and a variable resistor R13. The collector electrodes of transistors Q6 and Q7 are directly connected to a differential amplifier. The base electrodes of transistors Q6 and Q7 are connected to a source of biasing potential through a resistor R14. The base of transistors Q6 and Q7 is fixed at a potential lower than the source of biasing potential by reference diode D11.

The diode under test identified by reference numeral 5 in FIG. 1 and the diode 6 chosen as a standard are connected back to back across the collector electrodes of transistors Q6 and Q7. The current supplied to transistors Q6 and Q7 is supplied by the D.C. control amplifier which can be regarded as a high impedance current source. The current is equally divided between transistors Q6 and Q7 by adjustment of variable resistor R13 and applied to diodes 5 and 6.

As mentioned previously in the description of the system block diagram of FIG. 1, the voltage across diodes 5 and 6 is applied to the vertical plates of an oscilloscope such as the Tektronic 502 through a differential amplifier 7. The horizontal plates of the oscilloscope are connected to resistor R9 in the circuit of the D.C. amplifier.

The current divider itself is a high output impedance device which implies that the current for each diode is not effected by the relative great change in impedance of diodes 5 and 6. Without the above mentioned high impedance circuits the current division in the diodes would not be fixed and would vary with the impedance of the diodes under test.

It is to be understood that the minimum test current may be varied depending on the range of interest. A meter I may be positioned between D.C. amplifier 3 and current divider 4 as shown in FIG. 3 to test the minimum test current which minimum current may be varied by varying R7 as mentioned previously. The diode D10 across the meter I protects the meter during the sweeping and limits the current to a safe value when the oscillator is operative during tests.

It is further to be understood that the above described testing apparatus could be easily modified to permit matching of any electrical devices having similar characteristics including transistors. The invention is not limited to the matching of pairs of diodes.

What is claimed is:

1. A test apparatus, for matching groups of diodes having similar characteristics, comprising:
    means for connecting a first diode to be tested in series opposition with a second diode arbitrarily chosen as a standard;
    a source of periodically varying potential varying from a minimum to a maximum value corresponding to a predetermined current range;
    a voltage to current converter, having a high output impedance, connected to said source;
    a current divider connected between said current converter and said diodes for equally dividing the current between the first and second diodes;
    and means for detecting and recording the degree of voltage variation across both said diodes at any point of the current range due to the difference in their current/voltage characteristics.

2. A test apparatus, for matching groups of diodes having similar characteristics, comprising:
    means for connecting a first diode to be tested in series opposition with a second diode arbitrarily chosen as a standard;
    a source of sinusoidal potential having a maximum amplitude corresponding to a maximum value of a predetermined current range;
    means for eliminating output potentials below a predetermined level corresponding to a minimum value of the predetermined current range;
    a voltage to current converter, having a high output impedance, connected to said source;
    a current divider connected between said current converter and said diodes for equally dividing the current between the first and second diodes;
    and means for detecting and recording the degree of voltage variation across both said diodes at any point of the current range due to the difference in their current/voltage characteristics.

References Cited

UNITED STATES PATENTS 2,743,420  4/1956  Haldeman _____ 324—158

FOREIGN PATENTS 784,367  10/1957  Great Britain.

OTHER REFERENCES

Semiconductor Products, "Constant Current Testing" (W. H. Buchsbaum), February 1960, pages 47 and 48.

RUDOLPH V. ROLINEC, Primary Examiner

E. L. STOLARUN, Assistant Examiner

U.S. Cl. X.R.

324—57